US008020006B2

(12) United States Patent
Leung, Jr.

(10) Patent No.: US 8,020,006 B2
(45) Date of Patent: Sep. 13, 2011

(54) PIPELINE FOR HIGH-THROUGHPUT ENCRYPT FUNCTIONS

(75) Inventor: Arthur Tung-Tak Leung, Jr., Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 1116 days.

(21) Appl. No.: 11/351,429

(22) Filed: Feb. 10, 2006

(65) Prior Publication Data

US 2007/0195951 A1    Aug. 23, 2007

(51) Int. Cl.
  *H04L 9/06* (2006.01)
  *H04K 1/00* (2006.01)
  *G06F 1/00* (2006.01)
(52) U.S. Cl. ............. 713/189; 713/500; 380/28; 380/37
(58) Field of Classification Search ............. 380/37; 713/161–163; 709/250
  See application file for complete search history.

(56) References Cited

U.S. PATENT DOCUMENTS

| 5,313,530 | A | * | 5/1994 | Iwamura | 380/28 |
| 5,321,752 | A | * | 6/1994 | Iwamura et al. | 713/174 |
| 5,905,725 | A | * | 5/1999 | Sindhu et al. | 370/389 |
| 6,922,717 | B2 | * | 7/2005 | Ruehle | 708/620 |
| 7,318,160 | B2 | * | 1/2008 | Hopkins et al. | 713/189 |
| 7,360,076 | B2 | * | 4/2008 | Anand et al. | 713/151 |
| 7,693,925 | B2 | * | 4/2010 | Mathew et al. | 708/491 |
| 2002/0015422 | A1 | * | 2/2002 | Inada et al. | 370/474 |
| 2003/0018675 | A1 | * | 1/2003 | Asai et al. | 708/322 |
| 2003/0065696 | A1 | * | 4/2003 | Ruehle et al. | 708/491 |
| 2003/0108056 | A1 | * | 6/2003 | Sindhu et al. | 370/401 |
| 2003/0163589 | A1 | * | 8/2003 | Bunce et al. | 709/250 |
| 2006/0294059 | A1 | * | 12/2006 | Chamberlain et al. | 707/3 |
| 2007/0203961 | A1 | * | 8/2007 | Mathew et al. | 708/7 |
| 2007/0277036 | A1 | * | 11/2007 | Chamberlain et al. | 713/171 |
| 2008/0062803 | A1 | * | 3/2008 | Fronte et al. | 365/230.03 |

* cited by examiner

*Primary Examiner* — Christopher A Revak
(74) *Attorney, Agent, or Firm* — Schwegman, Lundberg & Woessner, P.A.

(57) ABSTRACT

A method and network device to process network data is described. The method may comprise receiving the network data and security operation data at a security engine. The security operation data may be associated with a security operation (e.g., encryption, decryption, hashing, or the like) to be performed on the network data. The network data and the security operation data is communicated to a systolic array including a plurality of serially interconnected processing elements each defining a processing stage. Data in each processing stage may be processed in parallel to obtain processed network data. The processed data may be stored in a memory for use by a network processing module and may identify a destination of a packet in the network. In an example embodiment, decryption or encryption may be divided up into a plurality of sub-operations wherein each sub-operation is performed by a processing stage.

24 Claims, 10 Drawing Sheets

PIPELINE FOR HIGH-THROUGHPUT ENCRYPT FUNCTIONS

FIELD

This application relates to a method and system to provide encryption and/or decryption of data (e.g., packets) in a network.

BACKGROUND

Packet switched networks, such as the Internet, divide a message or a data stream transmitted by a source into discrete packets or datagrams prior to transmission. Upon receipt of the packets by the recipient, the packets are recompiled to form the original message or data stream. As a packet-switched network, the Internet is comprised of various physical connections between computing devices, servers, routers, sub-networks, and other devices which are distributed throughout the network.

Routers connect networks, and each router has multiple inputs and multiple outputs coupled to independent network devices such as servers or other routers, the connections being made through communications links such as optical fibers or copper wires or the like.

Routers receive packets being sent over the network and determine the next hop or segment of the network to which each packet should be sent through one of the ports of the router. When the router passes the packet to the next destination in the network, the packet is one step closer to its final destination. Each packet includes header information indicating the final destination address of the packet.

Conventionally, routers include memories and microprocessors therein for processing the packets received by the routers, as well as for performing other functions required of the router. A route processor is a dedicated embedded subsystem which is responsible for communicating with the neighboring routers in the network to obtain current and ever-changing information about the network conditions. The route processor forms a routing table which is downloaded into and subsequently accessed for forwarding packets by a forwarding engine.

The forwarding engine of the router is responsible for determining the destination address and output port within the router to which the received packet is directed, this determination conventionally being made by accessing a routing table containing routing information for the entire network and performing a look-up operation.

Conventionally, determining the destination port within the router to which the received packet is to be sent is a computationally intensive process, particularly in view of the high data rates of the network (known as the "line rate"), such as 10 gigabytes/second. At this line rate, a forwarding engine within a router must make the destination port determination for approximately 30 million minimum-sized IP packets per second per port. Accordingly, as the router receives multiple packets, a conventional forwarding engine utilizes the large buffer memory on its front end to temporarily store a number of packets until the path is determined of the packet presently being processed by the forwarding engine.

Internet security concerns also increase the amount of time that a router needs to determine a destination port for a packet. For example, a packet is often encrypted to protect the data contained in the packet. In order to determine where to send the packet, the router needs to decrypt the packet, read the address information, determine the destination port, and then encrypt the packet again before sending it to its destination port. Conventional encryption and decryption engines in routers and networking devices often take several cycles to process a packet. Therefore, performing the encryption and decryption processes can result in a significant bottleneck in the transmission of network traffic.

As such, conventional forwarding engines for routers can be susceptible to performance degradation if the network traffic directed at the router is high, particularly when the packets are encrypted, thereby requiring that the decryption and encryption processes be performed quickly. Further, the increasing demand for IP-centric services over the Internet, such as voice over IP, streaming video, and data transfers to wireless devices with unique IP addresses, has increased the demand for data handling by the forwarding engines.

BRIEF DESCRIPTION OF DRAWINGS

The present invention is illustrated by way of example and not limitation in the figures of the accompanying drawings, in which like references indicate similar elements and in which.

DETAILED DESCRIPTION

Figure 1:
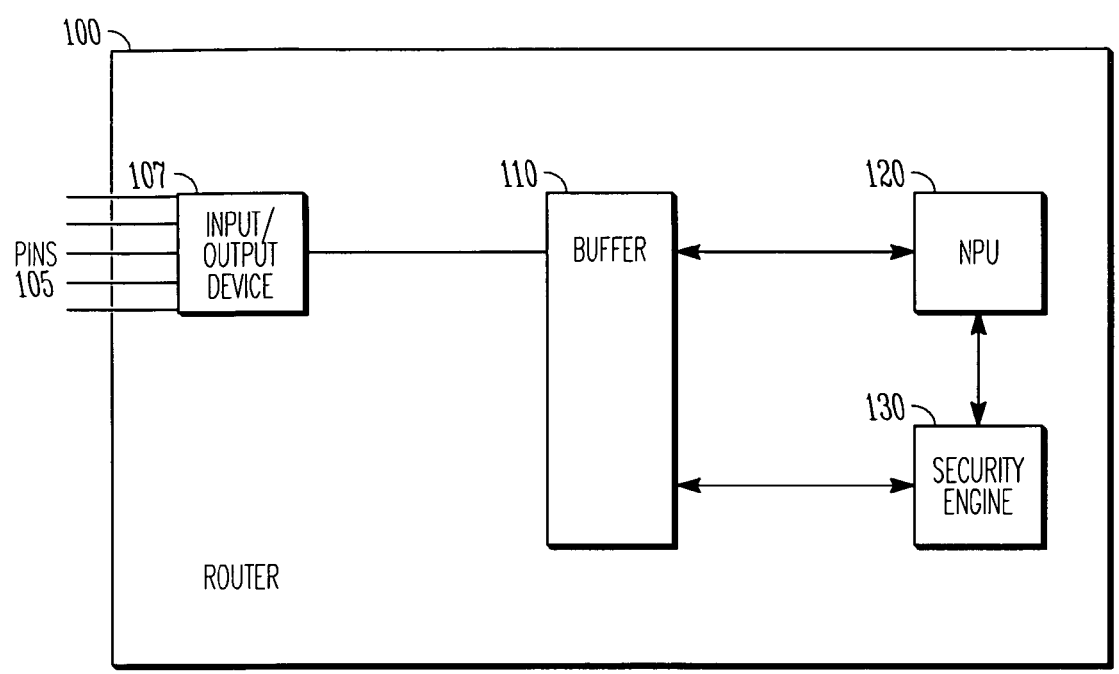
FIG. 1 shows an embodiment of a router, in accordance with an example embodiment, that includes a security engine having a systolic array pipeline for performing high throughput encryption/decryption functions.

In the following description, for purposes of explanation, numerous specific details are set forth in order to provide a thorough understanding of an embodiment of the invention. It will be evident, however, to one skilled in the art that the present invention may be practiced without these specific details.

A network processing device (e.g., a router) is provided that includes a security engine having a systolic array of specialized processors to perform successive rounds of an encryption or decryption function on a data packet. Data in the systolic array may flow synchronously across the array between neighboring specialized processors which may be arranged in a pipeline. The encryption/decryption function may be divided up into a plurality of sub-processes/steps and each specialized processor may perform one step or round of processing. Thereafter, the result from the particular round of processing is transferred to another specialized processor in the pipeline. In an example embodiment, the systolic array of specialized processors may execute sequential rounds of the encryption/decryption function on multiple data packets in a parallel manner.

In an example embodiment a router is described including a device such as a network processing unit (NPU) for determining the destination of a packet, and a security engine for performing encryption and/or decryption functions on data provided in a packet. The security engine, in accordance with an example embodiment, may employ a systolic array pipeline architecture. As used herein, the term "network processing unit" includes any processor, microprocessor, or other integrated circuit (or collections thereof) for processing network traffic and include determining the destination of a packet. The NPU of an example embodiment employs one or more systolic arrays in various execution units of the NPU to perform various operations on a packet as the packet passes through the NPU as described in co-pending U.S. application Ser. No. 10/177,187 filed Jun. 20, 2002, the entire contents which is incorporated herein by reference. In an embodiment, the NPU employs a single processing device to perform the various operations on the packet as the packet passes through the NPU. The term "security engine" includes any processor, microprocessor, or other integrated circuit (or collections thereof) which encrypts and/or decrypts data (e.g. data in a packet). In an example embodiment, the security engine employs one or more systolic arrays to perform encryption and/or decryption operations on a packet as the packet passes through a network processing node. The security engine may enhance throughput (bandwidth) of packets in a network processing device.

As used herein, the term "systolic array" or "systolic array pipeline" includes, but is not limited to, a series or collection of stages wherein each stage may contain a register file and one or more functional units. In an example embodiment, data or packet content may be processed by a given stage during a given round of systolic processing, then flow to the next stage for subsequent processing during a subsequent round. In an example embodiment, the stages of a systolic array are arranged in a generally linear or sequential order, wherein each stage is capable of performing an operation involved in the processing (e.g., encryption or decryption) of a packet. The data or packet content may be processed in each stage for the duration of the stage, which may last one or more clock cycles, after which the data or packet content is passed to a next stage for processing. The systolic array processes data in a systolic manner, which is a form of parallel processing. For example, during a given round of systolic processing, each stage in the systolic array may operate on data that has been loaded into it, so that all stages in the systolic array are operating simultaneously, or in parallel.

In an example embodiment, some of the stages of the systolic array are programmable to perform a processing operation involved in processing the packet under program control, while other stages of the systolic array can perform a delay operation where the data passes through a stage with no processing therein. In general, after every round of systolic processing, data or packet content is moved from one stage of the systolic array to the next stage in the systolic array, without blocking the intake of new packets or the processing of existing packets. As will be described below, the systolic array of the example security engine can receive new packets at a line rate of, for example, 40 gigabits/second, and can finish processing each packet at the line rate during steady state operation. The security engine may be adapted for use in a router, where the router has multiple bi-directional ports for receiving and transmitting data into and out of the router, and wherein each port is connected with different portions of the network. In an example embodiment, when the NPU receives a packet, the NPU operates to determine to which destination port of the router the packet should be sent out so that the packet gets closer to its final destination (e.g., the next hop in the network). It will however be appreciated that the security engine may be incorporated into any network processing device.

FIG. 1 shows an example embodiment of a router 100 that includes a security engine 130 having a pipeline for performing high throughput encryption and/or decryption functions. The router 100 is shown to receive packets at an input interface 105, which are connected to a network. The packets received are processed by an input/output device 107 and then stored in a buffer 110. The buffer 110 is connected to the security engine 130 and to a network processing module or unit (NPU) 120. The security engine 130 may perform a security operation (e.g., encryption, decryption, hashing, or the like) on the packets received. The NPU 120 may identify packets that are encrypted and instruct the security engine 130 to decrypt the encrypted packets. The NPU 120 passes information such as buffer pointers, keys, and initial vectors of the encrypted packets stored in buffer 110 to the security engine 130. The security engine 130 retrieves the encrypted packets from the buffer 110 and decrypts them systolically thus processing them in parallel. The security engine 130 may inform the NPU 120 when each packet has been decrypted. The NPU 120 determines the routing addresses for the decrypted packets and may instruct the security engine 130 to encrypt the packet again. When the input/output device 107 is ready to send the packets to their destination, the input/output device 107 retrieves them from the buffer 110 and sends them back onto the network through the input interface 105. It should be noted that the security engine 130 may perform encryption and/or decryption depending upon the device in which it is deployed.

Figure 2:
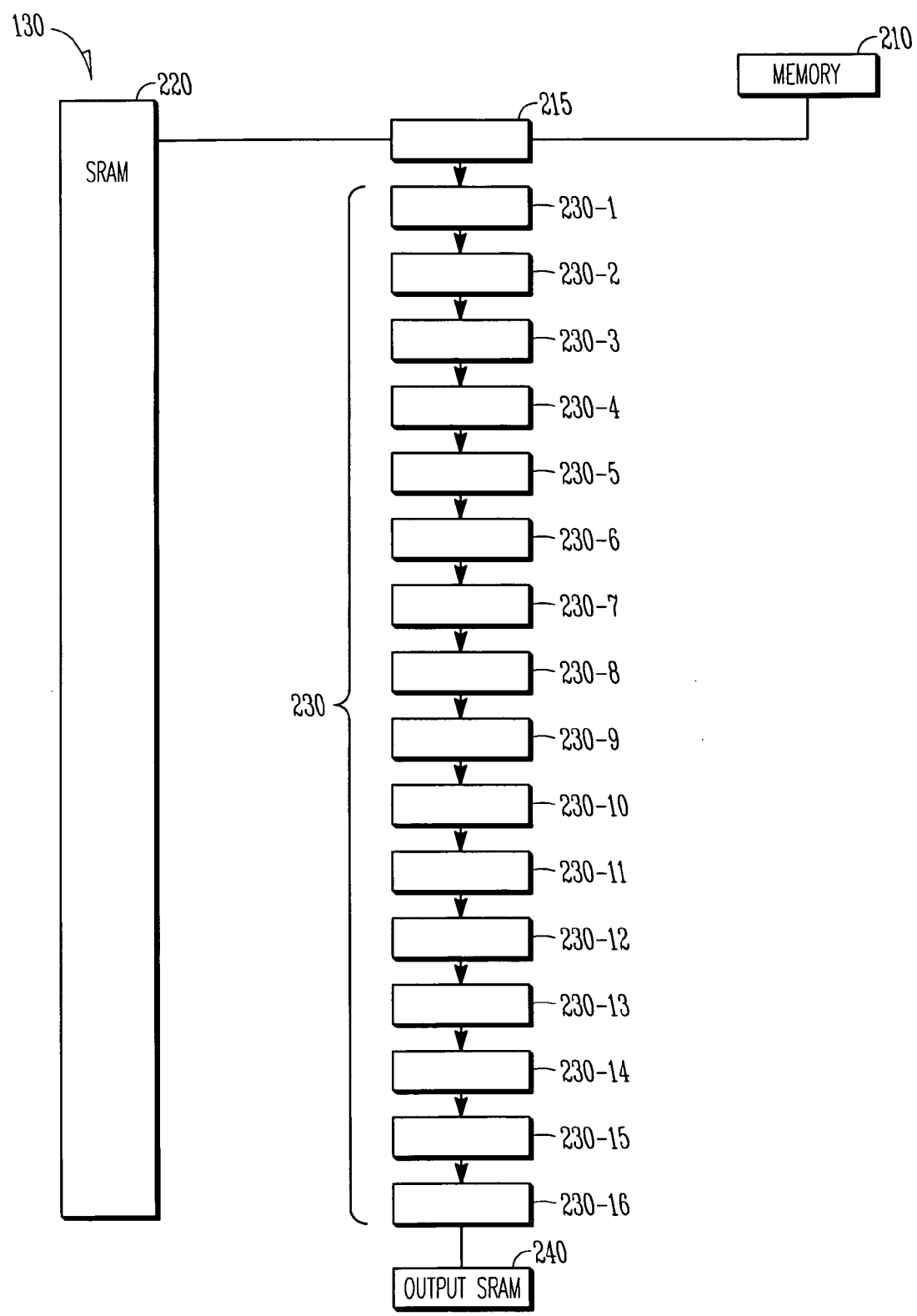
FIG. 2 shows an embodiment of a systolic array pipeline for performing high throughput encrypt functions used in the security engine of FIG. 1.

FIG. 2 shows an example embodiment of a pipeline for performing high throughput encrypt functions used in the example security engine 130. A memory 210 (e.g., SRAM or the like) may receive instructions and information from the NPU 120 needed to identify, retrieve and process packets received from the buffer 110 (shown in FIG. 1). For example, the security engine 130 may retrieve the identified packets from the buffer 110 and store them in a memory 220 (e.g., SRAM or the like). The pipeline in this example embodiment is shown to be a systolic array 230 having sixteen specialized processors, 230.1-230.16, where each specialized processor 230.1-230.16 performs one stage of an encryption or decryption function. Thus, a single encryption/decryption function or operation may be broken up into a plurality of sub-operations or parts and each sub-operation may be processed by a specialized processor. The specialized processors in the systolic array 230 operate systolically to process the data in parallel. For example, during a given round of systolic processing, each specialized processor 230.1-230.16 in the systolic array 230 operates on the data that has been loaded into it. This simultaneous operation of every specialized processor 230.1-230.16 in the systolic array 230 allows multiple packets to be processed in a parallel manner. It will however be appreciated that other embodiments may include a different number of specialized processors. Processed data is passed along the pipeline between neighboring specialized processors in a serial fashion.

In an example embodiment, the security engine 130 loads a first encrypted packet from the memory 220 into the first specialized processor 230.1 where a first decryption function (or part of a decryption function) is performed on the encrypted packet during a stage of the decryption process. The first packet then moves to the second specialized processor 230.2 of the systolic array 230, and another encrypted packet is retrieved from the memory 220 for processing by the first specialized processor 230.1. At this point it should be appreciated that while specialized processor 230.2 is processing the output from the specialized processor 230.1, the specialized processor 230.1 is processing its new data retrieved from the memory 220 and thus processing functions are being performed in parallel (e.g., sub-parts of a decryption process or function are being performed in parallel). Thus, during each stage of the decryption process the specialized processors 230.1 to 230.16 operate in parallel by simultaneously performing their respective decryption functions to their data received. The first encrypted packet continues to move through the systolic array 230 until it is completely decrypted at the last specialized processor 230.16. The decrypted packet is then placed in an output memory 240 such as SRAM (which may be provided by the buffer 110) and the NPU 120 is notified that this packet is decrypted. Although the output memory 240 is shown separate from the memory 220, in an example embodiment, the memory 240 forms part of the memory 220.

In an example embodiment, a controller 215 pulls parts or "chunks" of packet data from the memory 220 and, accordingly, may thus schedule new packet starts in the systolic array 230. The controller 215 may also communicate with memory 210. The content of a read from memory 220 and a read from memory 210 may be unified and sent to specialized processor 230.1.

In an example embodiment, after each round of systolic processing, a new packet data is provided to the first specialized processor 230.1 and packet data in the specialized processors 230.2 to 230.15 advances to the next element or specialized processor in the pipeline. Packet data in the last stage or specialized processor 230.16, which has completed the decryption process, is written back to the buffer 110. For example, output data may provide routing information that the NPU 120 can utilize to route the packet appropriately. In an example embodiment, the security engine 130 pre-fetches encrypted packets from the buffer 110 as memory becomes available in the memory 220. In an example embodiment, a data block is fetched (or pre-fetched) from the memory 220. The size of the data block being fetched may be dependent upon an algorithm used in the security operation used to secure the data.

In an example embodiment, the security engine 130 pre-fetches packets based on an amount of space that is available in the memory 220 and also based on the consumption of the data that has previously been loaded in the memory 220. For example, if the security engine 130 knows that the memory 220 is almost out of data, the security engine 130 can pre-fetch the next piece of packet data based on the amount of data that is remaining in the memory 220, (e.g., if only 4 bytes of data remain in the memory 220, and each specialized processor 230.1-230.16 operates on 20 bytes of data, then the security engine 130 can pre-fetch 16 bytes of data, so that the next time the memory 220 is scheduled to feed the systolic array 230, the memory 220 has enough data to do that).

In the example embodiment given above, each specialized processor 230.1-230.16 operates on a packet data. Each specialized processor 230.1-230.16 can also operate on a portion of a packet. For example, the security engine 130 can divide each packet into portions, and load each portion into the pipeline 230 until the entire packet is decrypted. In this case, the security engine 130 notifies the NPU 120 that the packet is decrypted after the final encrypted portion of the packet is decrypted.

In an example embodiment, after the NPU 120 determines the routing information for the decrypted packets, the NPU 120 may instruct the security engine 130 to encrypt the packets again before sending them to their destination. For example, the security engine 130 may re-encrypt the packet as a router may make some modifications to a header of the packet and this information may need to be re-encrypted as encryption of the last byte of a packet may depend on the encryption of the bytes that preceded it. Accordingly, in an example embodiment, the entire packet may be re-encrypted again before it is sent out by the router. The security engine 130 may perform this encryption process using a systolic array pipeline, such as the pipeline 230 shown in FIG. 2, where each specialized processor 230.1-230.16 in the pipeline 230 performs one stage of an encryption process or algorithm. Thus, the encryption/decryption process is broken up into a plurality of steps which can be performed sequentially in order to encrypt/decrypt data.

Figure 3:
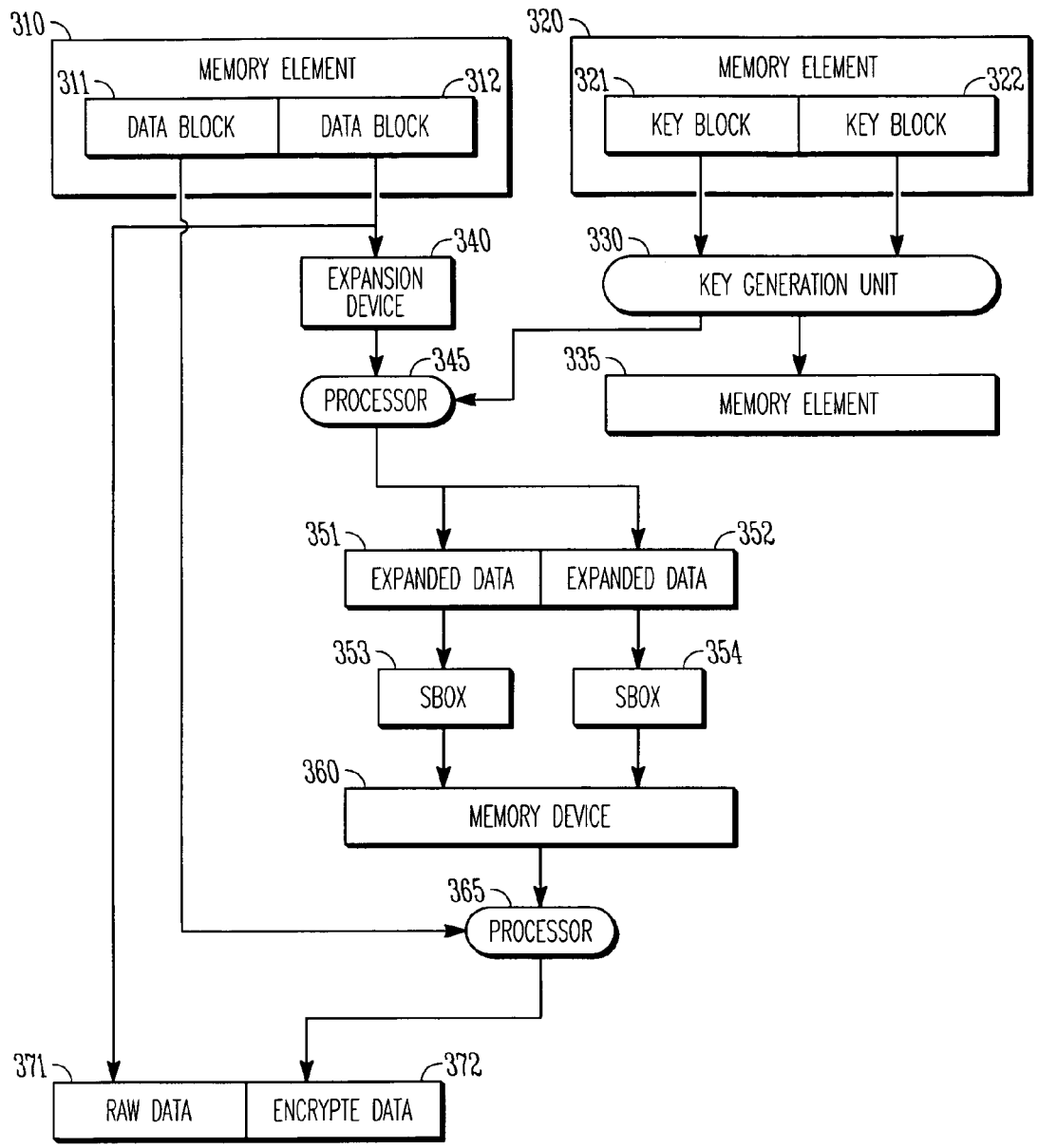
FIG. 3 shows an example embodiment of a circuit that can be implemented in a specialized processor of a systolic array to perform an encryption function.

FIG. 3 shows an example embodiment of a circuit that can be used to implement the specialized processors, for example, the specialized processor 230.1 to perform an encryption function. In this example embodiment, the specialized processor 230.1 may perform one stage of a data encryption standard (DES) encryption function. A memory element 310 is shown to receive (e.g., from the buffer 110) the raw data (e.g., data for encryption) and divide it into two data blocks 311 and 312. A memory element 320 is shown to receive a raw key (e.g., to encrypt the raw data) and divide the key into two key blocks 321 and 322. Thereafter, a key generation unit 330 executes a key generation function to generate a key for the next stage, which is stored in a memory element 335.

Raw data from block 312 is expanded by an expansion device 340. The expanded data and the key generated for the next stage (next stage key) are then processed by a processing device 345. For example, an exclusive-OR function can be used to process the expanded data with the next stage key. The processed data is divided and stored as expanded data 351 and expanded data 352. A substitution box (sbox) 353 may be used to process the expanded data 351, and substitution box 354 may be used to process the expanded data 352. The results of the operations in substitution boxes 353 and 354 may be stored in a memory device 360. The data from the memory device 360 is processed with the raw data in block 311 by a processing device 365, which performs a function (such as exclusive-OR) to produce encrypted data stored in a device 372. The raw data 312 is also stored in device 371. The data in devices 371 and 372 form an encrypted result of this stage of the encryption process. The encrypted result of this stage is then sent to the next stage for further encrypting.

Figure 4:
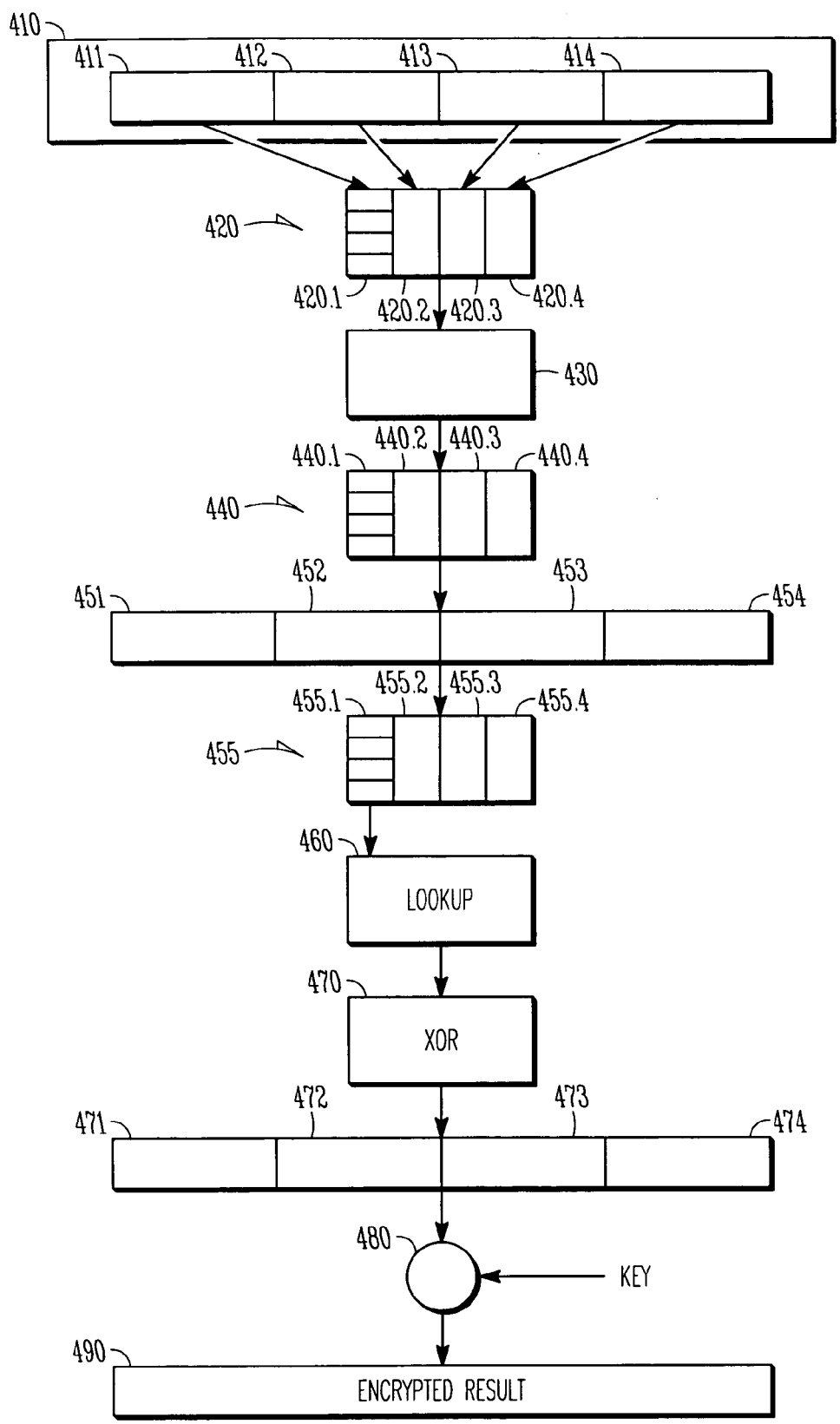
FIG. 4 shows another example embodiment of a circuit that can be implemented in a specialized processor of the systolic array to perform an encryption function.

FIG. 4 shows another example embodiment of a circuit that can be used to implement the specialized processor 230.1 of the systolic array 230. In this example embodiment, the specialized processor 230.1 may perform one stage of an Advanced Encryption Standard (AES) encryption function. A memory element 410 receives raw data, and divides it into data blocks 411, 412, 413, and 414. The data blocks 411, 412, 413, and 414 are then arranged into stacks 420.1-420.4 by the device 420. A substitution box 430 then performs substitution functions to the stacks 420.1-420.4 to produce processed stacks 440.1-440.4 of a stack 440. The stacks 440.1-440.4 are re-mapped into memory elements 451-454. A lookup device 460 processes the data from memory elements 451-454. The data is then re-arranged into stacks 455.1-455.4 by a device 455, which sends the data to a lookup table device 460. The lookup device 460 performs substitutions to the data and sends the processed data to a processing device 470, which performs a computational function, such as an exclusive-OR function. The data is then sent to memory elements 471, 472, 473, and 474. The encrypted data is processed with a key at 480, and an encrypted result 490 is sent to the next stage of the array.

Figure 5:
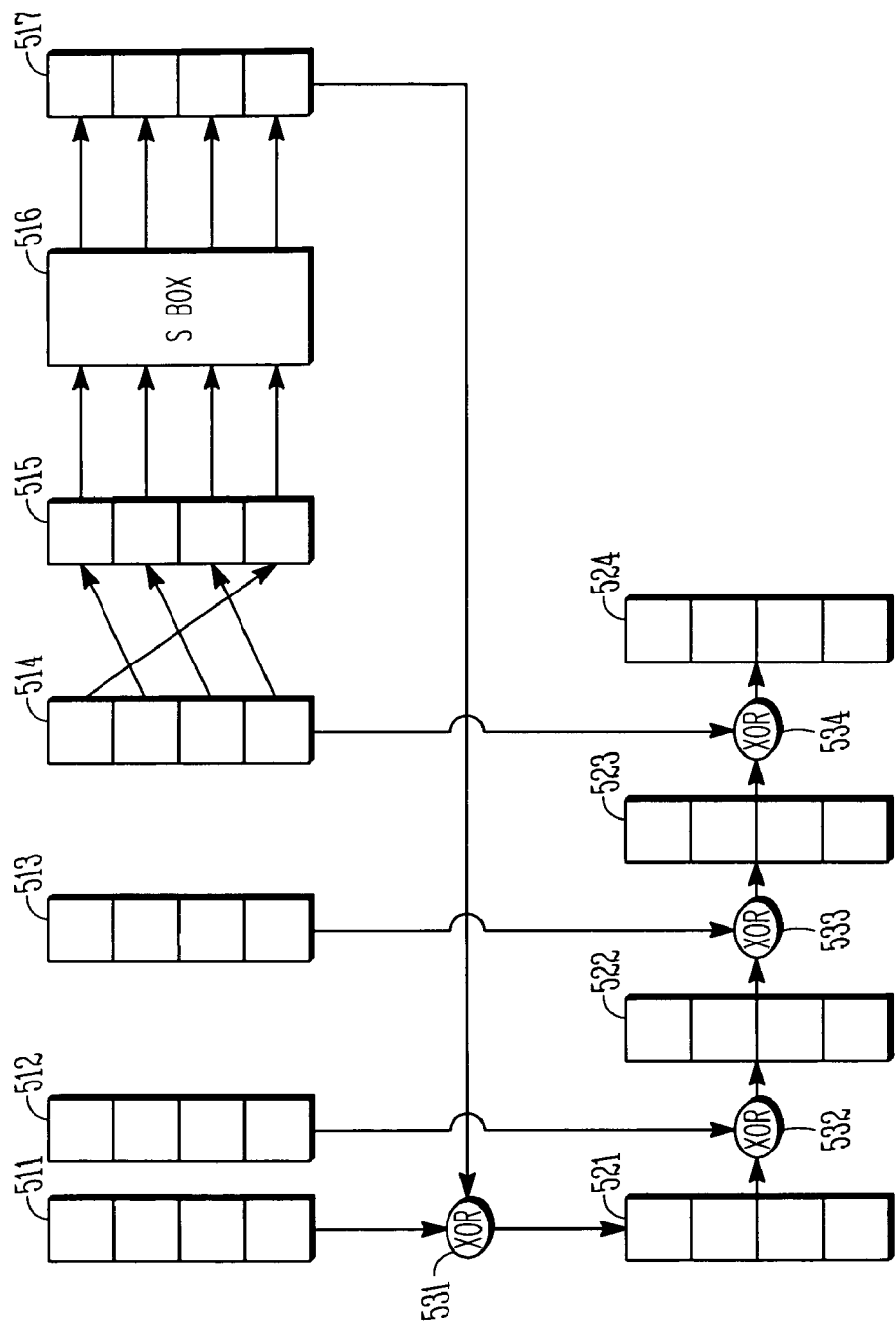
FIGS. 5 and 6 show circuits, in accordance with an example embodiment, that can be implemented in a specialized processor of the systolic array, to perform an encryption function of a key.

FIG. 5 shows an example of a circuit that can be used to implement the specialized processor 230.1 of systolic array 230. In this example embodiment, the specialized processor 230.1 performs an encryption function and the circuit may be used to generate a key (e.g., a key used to perform AES encryption). In the example embodiment, an intermediate key is divided into four portions. The four portions are stored in registers 511, 512, 513, and 514, respectively. The portion stored in register 514 is scrambled and stored in register 515. The portion stored in 515 is fed to a substitution box 516, and an output of the substitution box 516 is stored in a register 517. The key portions from the registers 511 and 517 are input to an XOR circuit 531 and the result is stored in a register 521. The portions from the registers 512 and 521 are input to an XOR circuit 532, and the result is stored in a register 522. The portions from the registers 513 and 522 are input to an XOR circuit 533, and the result is stored in register 523. The portions from registers 514 and 523 are input to an XOR circuit 534, and the result is stored in a register 524. The contents of the registers 521, 522, 523, and 524 may provide one element of the AES key and, for example, may be used in one round the encrypt/decrypt of packet data. The results may also be used as the intermediate key to generate the next round's key.

Figure 6:
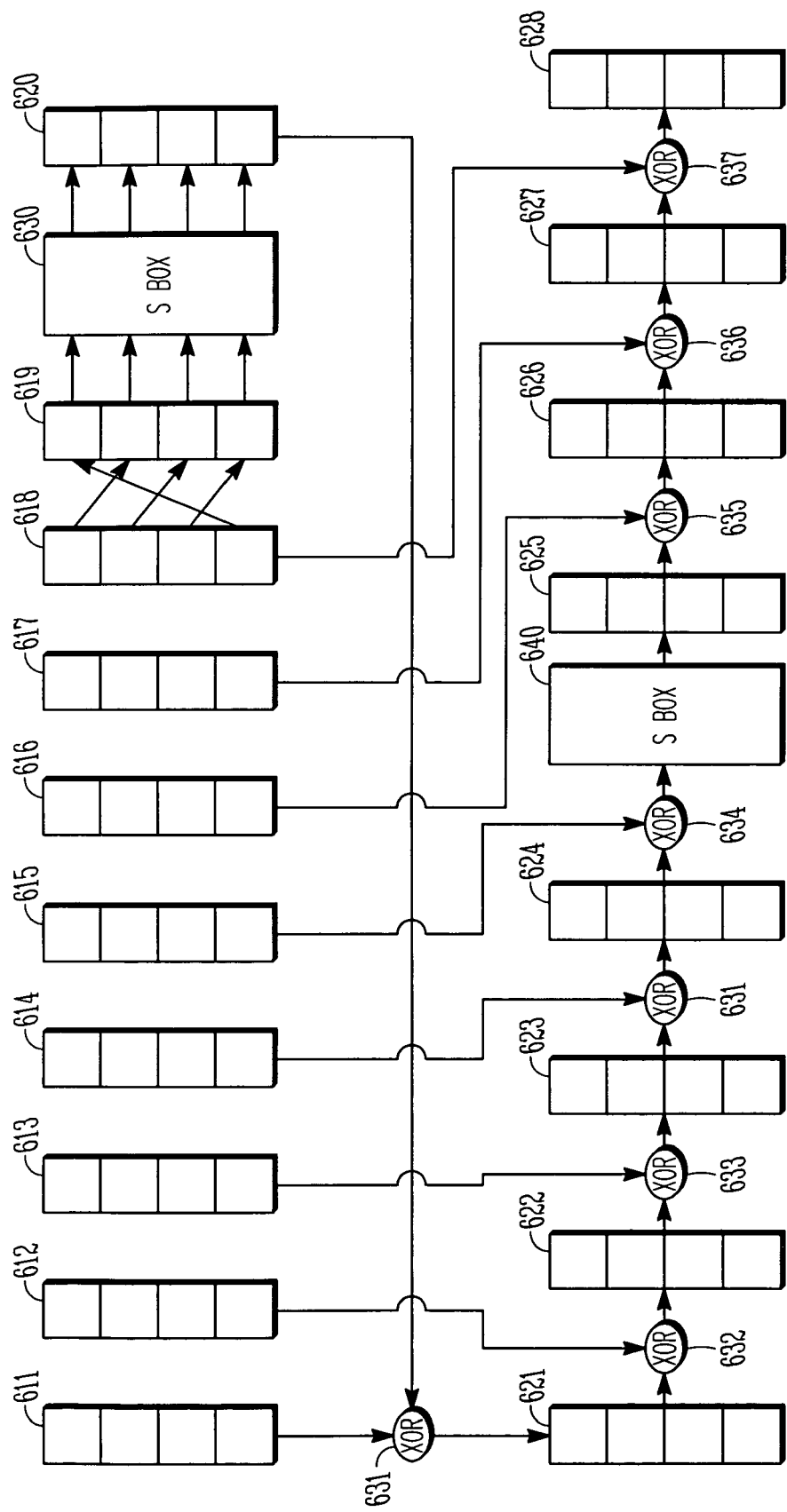

FIG. 6 shows another example embodiment of a circuit that can be used to implement the specialized processor 230.1 for encrypting a key. In this example, the intermediate key is divided up into 8 example portions and stored in registers 611, 612, 613, 614, 615, 616, 617 and 618. The content of the register 618 are scrambled and stored in a register 619, and then processed by a substitution box 630. The output of substitution box 630 is stored in a register 620. The content of the registers 611 and 620 are fed to an XOR device 631, and the output of the XOR device 631 is stored in a register 621. The content of the registers 612 and 621 are input to an XOR device 632 and the processed data is then stored in a register 622. The contents of the registers 613 and 622 are input to an XOR device 633 and the processed data is then stored in a register 623. The content of the registers 623 and 614 are input to an XOR device 631 and the processed data is then stored in a register 624. The contents of the registers 615 and 624 are input to an XOR device 634, and are then processed by a substitution box 640. The output of substitution box 640 is stored in a register 625. The contents of the registers 616 and 625 are input to an XOR device 635 and the processed data is then stored in a register 626. The contents of the registers 617 and 626 are input to an XOR device 636 and processed data is then stored in a register 627. The contents of registers 618 and 627 are input to an XOR device 637 and the processed data is then stored in a register 628. The contents of the registers 621, 622, 623, 624, 625, 626, 627, and 628 form the encrypted key.

Figure 7:
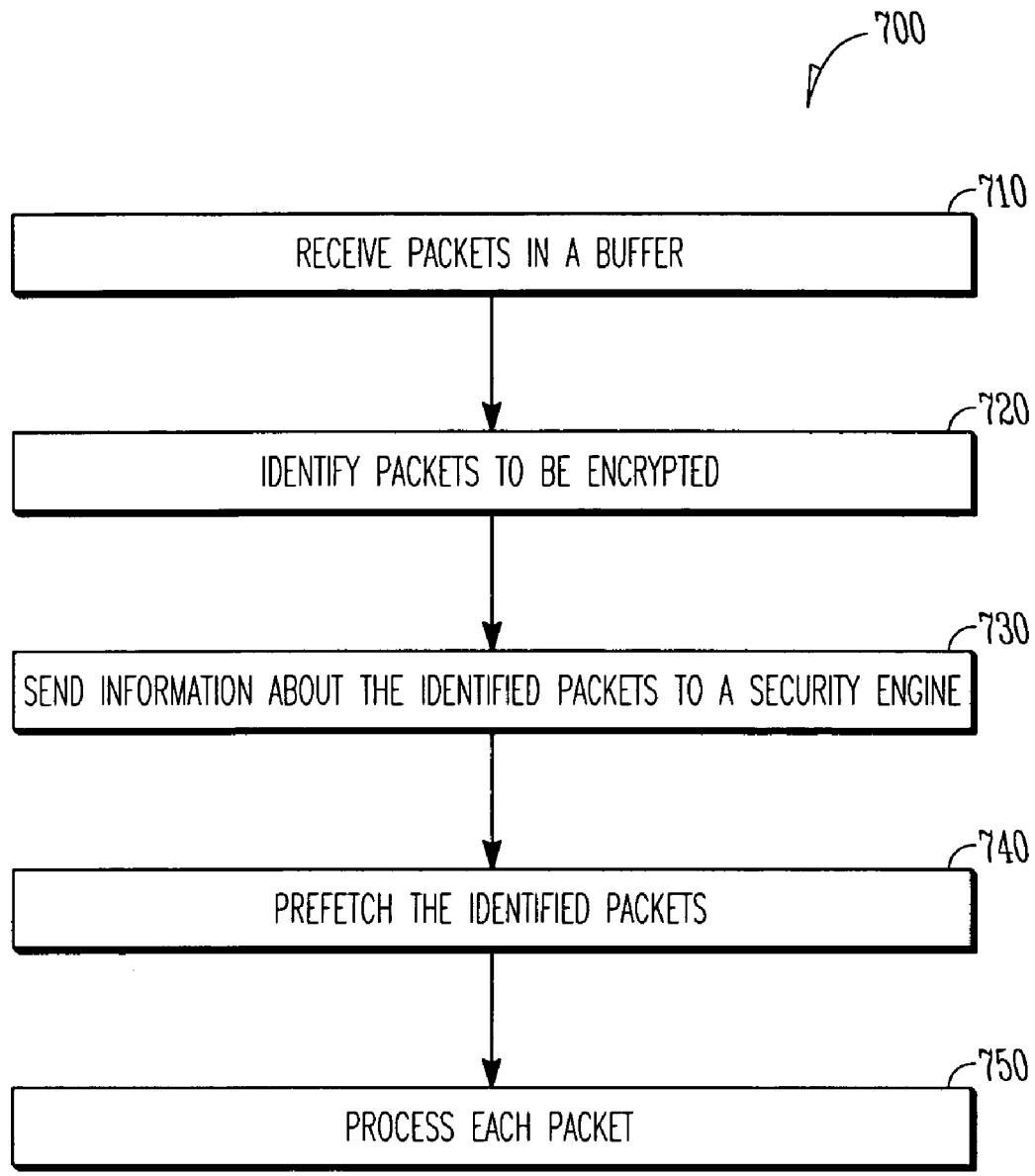
FIG. 7 shows an example of a method, in accordance with an example embodiment, of using a systolic array pipeline to perform encryption and/or decryption functions.

FIG. 7 shows an example of a method 700 that uses a systolic array pipeline to perform encryption functions. It will be appreciated that the method 700 may also be used to perform decryption functions. Multiple packets may be received in a buffer (see block 710). Packets to be encrypted are then identified as shown at block 720. Information about the identified packets is sent to a security engine (e.g., the security engine 130) as shown at block 730. The identified packets may be pre-fetched from the buffer to a queue in the security engine (see block 740). Each packet in the queue may be processed using a pipeline of specialized processors as shown at block 750.

For example, a first packet is received at a first specialized processor in the pipeline from a local memory in the security engine. A first encryption function is performed on the packet by the first specialized processor during a first systolic cycle of the pipeline. The first specialized processor may then send the first packet to a second specialized processor in the pipeline, and simultaneously receive a second packet. The first encryption function is performed on the second packet by the first specialized processor, and, concurrently, the second specialized processor performs the second encryption function to the first packet. In general, after each systolic cycle, each packet in one of the specialized processors is sent to the next specialized processor in the pipeline. The systolic array causes the specialized processors to concurrently (or almost concurrently) perform each of their encryption functions to their respective packets, and send the result to the next processing element. The last specialized processor in the pipeline sends the encrypted packet to the buffer. As the local memory loads the pipeline with packets, the security engine can pre-fetch additional packets from the buffer to be encrypted.

Figure 8:
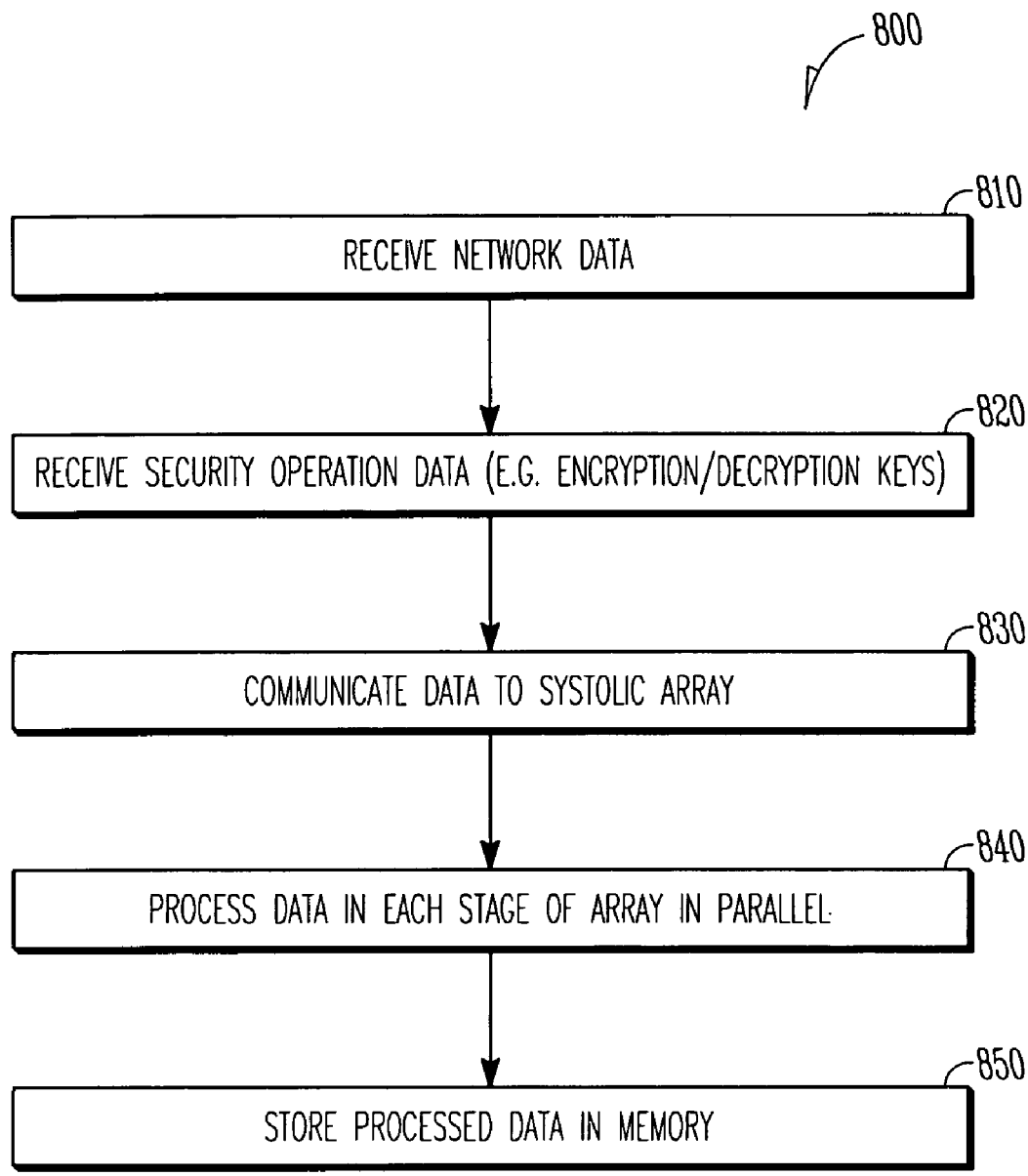
FIG. 8 shows an example method of processing data in a network device.

FIG. 8 shows an example method 800 of processing data in a network device. The method 800 may, for example, be performed by the router 100 shown in FIG. 1. As shown at blocks 810 and 820, network data (e.g., packets) and security operation data (e.g., encryption keys, decryption keys, hashes, or any other security data) may be received at a security engine (e.g., the security engine 130). Thereafter, as shown at block 830, the network data and the security operation data is communicated to a systolic array or pipeline (e.g., a systolic array 230 having specialized processors including a plurality of serially interconnected processing elements each defining a processing stage as shown in FIG. 2). The method 800 then processes data in each processing stage in parallel to obtain processed network data and stores the processes data in memory (see blocks 840 and 850). The processed data may be used by a network processing module (e.g., the NPU 120).

As mentioned above the security operation may decrypt information to identify a destination of a packet in the network. Thus, the decryption operation (or processing of the data) may comprise dividing the decryption operation up into a plurality of sub-operations wherein each sub-operation is performed by a processing stage. The result may provide processed network data which provides a decrypted version of the network data. In an example embodiment, the network data is divided into data blocks and each data block is sequentially processes in the systolic array.

Figure 9:
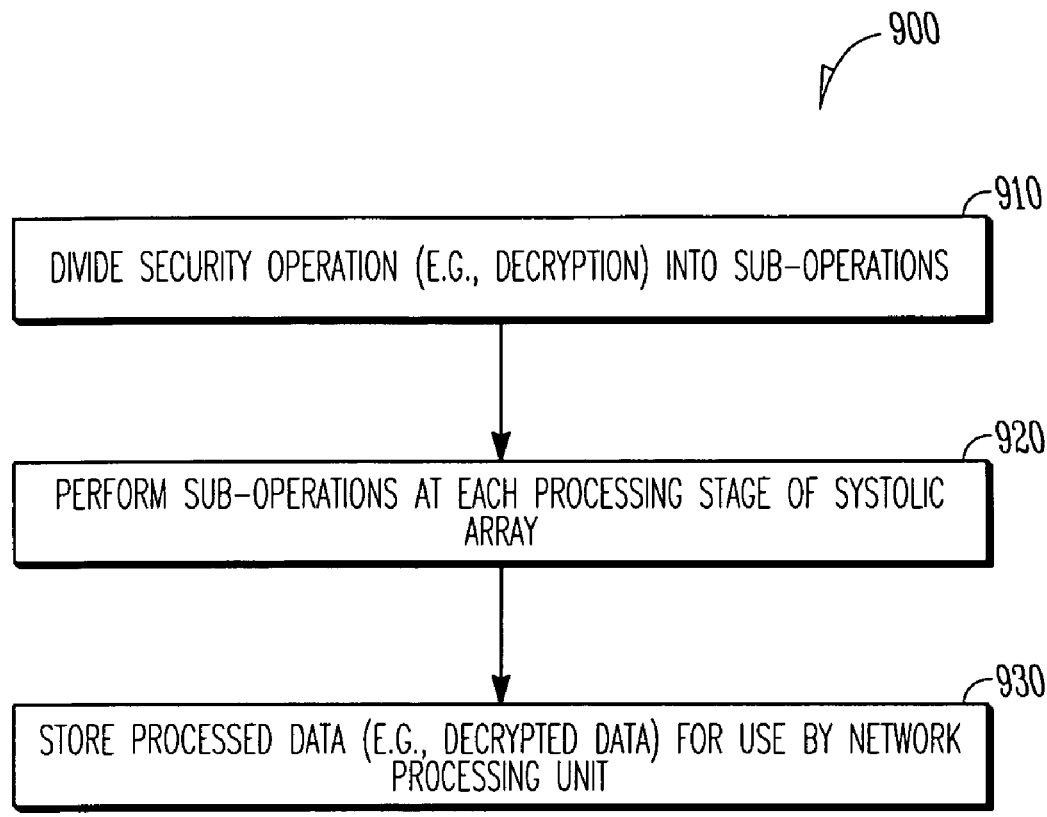
FIG. 9 shows a method, in accordance with an example embodiment, for processing data in a security engine.

Thus, each processing stage may perform part of sequential decryption operation of the network data where data is sequentially passed along a pipeline defined by the systolic array. FIG. 9 shows a method 900, in accordance with an example embodiment, for processing data in a security engine. As shown at block 910, the security operation (e.g., decryption, encryption, hashing, or the like) may be divided up into a plurality of sub-operations. Thereafter, as shown at block 920, each sub-operation is performed by a processing stage of a systolic array and the output of the systolic array or pipeline provides processed data (e.g., decrypted data, for use by a network processing unit) which is a decrypted version of the network data. The processed data may then be stored in for use by a network processing unit (see block 930).

Figure 10:
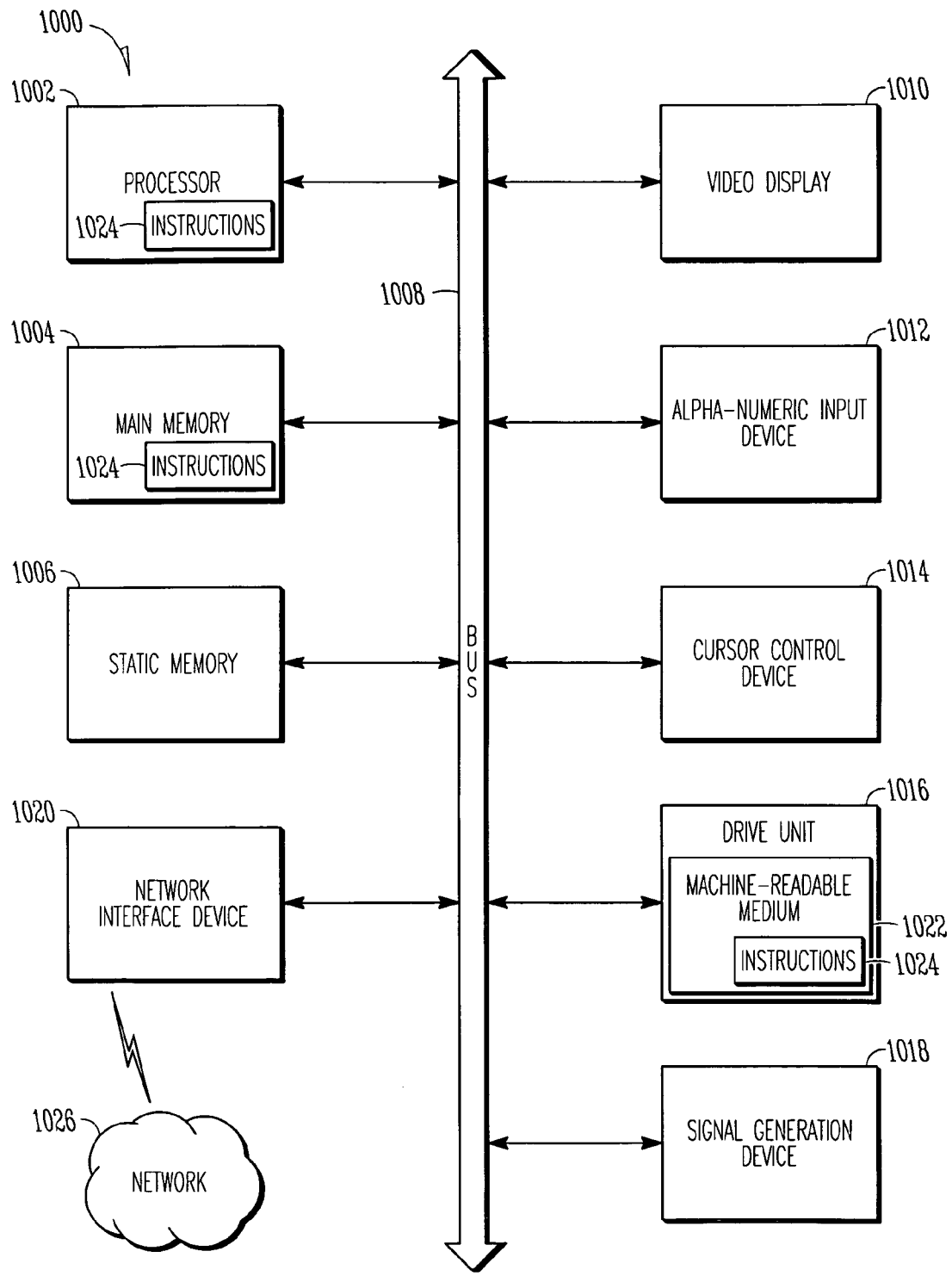
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020 utilizing any one of a number of well-known transfer protocols (e.g., HTTP).

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A method of processing data in a network device, the method comprising:
   receiving the network data at a security engine;
   receiving security operation data at the security engine, the security operation data being associated with a security operation to be performed on the network data;
   processing the security operation data into a plurality of security operation data components each of which is configured for use within a sub-operation to be performed on the network data;
   communicating the network data and the plurality of security operation data components to a systolic array including a plurality of serially interconnected processing elements each defining a processing stage, the plurality of serially interconnected processing elements adapted to complete each respective processing stage in a fixed number of clock cycles, the fixed number of clock cycles common across the plurality of serially interconnected processing elements, and the plurality of serially interconnected processing elements each including a register file and a functional unit;
   processing data in each processing stage in parallel to obtain processed network data; and
   storing the processed data in a memory for use by a network processing module.

2. The method of claim 1, in which the security operation is a decryption operation and processing in each processing stage decrypts the network data.

3. The method of claim 2, in which the processing in a plurality of processing stages decrypts information identifying a destination of a packet in the network, and wherein processing data in each stage in parallel comprises:
   dividing decryption up into a plurality of sub-operations wherein each sub-operation is performed by a processing stage; and
   obtaining processed network data which provides a decrypted version of the network data.

4. The method of claim 3, in which the security operation data provides a decryption key, the method comprising processing the decryption key into a plurality of key components each of which is configured for performing a sub-operation.

5. The method of claim 1, which comprises:
   dividing the network data into data blocks; and
   processing each data block sequentially in the systolic array.

6. The method of claim 1, wherein the network data is included in a packet, the processing in each processing stage identifying a destination address of the packet.

7. The method of claim 1, where each processing stage performs part of a sequential decryption operation of the network data where data is sequentially passed along a pipeline defined by the systolic array.

8. The method of claim 1, in which receiving the network data includes fetching a data block from a memory, the size of the block being dependent upon an algorithm used in security operation used to secure the data.

9. The method of claim 8, in which the data block is pre-fetched from the memory.

10. The method of claim 1, in which the security operation data are received from a network processing unit that processes network data in the form of packets, the network processing unit configured to determine a destination of a packet, and the security engine performing the security operation to identify the destination address from a secured destination address.

11. The method of claim 1, in which the security operation is an encryption operation and processing in each processing stage encrypts the network data.

12. The method of claim 11, in which the processing in a plurality of processing stages encrypts information identifying a destination of a packet in the network, and wherein processing data in each stage in parallel comprises:
   dividing the encryption up into a plurality of sub-operations wherein each sub-operation is performed by a processing stage; and
   obtaining processed network data which provides an encrypted version of the network data.

13. The method of claim 12, in which the security operation data provides a encryption key, the method comprising processing the encryption key into a plurality of key components each of which is configured for performing a sub-operation.

14. A machine-readable storage device embodying instructions which, when executed by a machine, cause the machine to:
   receive the network data at a security engine of a network device;
   receive security operation data at the security engine;
   process the security operation data into a plurality of security operation data components each of which is configured for use within a sub-operation to be performed on the network data;
   communicate the network data and the plurality of security operation data components to a systolic array including a plurality of serially interconnected processing elements each defining a processing stage, each processing stage being configured to process the network data in parallel to obtain processed network data for storage in the memory, the plurality of serially interconnected processing elements adapted to complete each respective processing stage in a fixed number of clock cycles, the fixed number of clock cycles common across the plurality of serially interconnected processing elements, and the plurality of serially interconnected processing elements each including a register file and a functional unit;
   process data in each processing stage in parallel to obtain processed network data; and
   store the processed data in a memory for use by a network processing module.

15. A network device for processing network data, the device comprising:
   a memory to receive network data and security operation data, the security operation data being associated with a security operation to be performed on the network data; and
   a security engine connected to the memory, the security engine including a systolic array including a plurality of serially interconnected processing elements each defining a processing stage, the security engine being configured to:
      process the security operation data into a plurality of security operation data components, each security operation data component to be used within a sub-operation to be performed on the network data, provide the network data and the plurality of security operation data components to the systolic array to process in parallel to obtain processed network data for storage in the memory,
      use the systolic array to complete the processing of the network data and each of the security operation data components in a fixed number of clock cycles, the fixed number of clock cycles common across all of the serially interconnected processing elements of the systolic array, and
      store the processed network data within the memory;
      wherein each of the serially interconnected processing elements of the systolic array include a register file and a functional unit.

16. The network device of claim 15, in which the security operation is decryption operation and processing in each processing stage decrypts the network data.

17. The network device of claim 16, in which the security operation decrypts information identifying a destination of a packet in the network, and wherein the security engine is configured to divide the decryption operation up into a plurality of sub-operations wherein each sub-operation is performed by a processing stage to obtain processed network data which provides a decrypted version of the network data.

18. The network device of claim 17, in which the security operation data provides a decryption key which is divided into a plurality of key components each of which is configured for performing a sub-operation.

19. The network device of claim 15, where each processing stage performs part of a sequential decryption operation of the network data where data is sequentially passed along a pipeline defined by the systolic array.

20. The network device of claim 15, in which the security operation is an encryption operation and processing in each processing stage encrypts the network data.

21. The network device of claim 20, in which the security operation encrypts information identifying a destination of a packet in the network, and wherein the security engine is configured to divide the encryption operation up into a plurality of sub-operations wherein each sub-operation is performed by a processing stage to obtain processed network data which provides an encrypted version of the network data.

22. The method of claim 12, in which the security operation data provides a encryption key, the method comprising processing the encryption key into a plurality of key components each of which is configured for performing a sub-operation.

23. The network device of claim 15, where each processing stage performs part of a sequential encryption operation of the network data where data is sequentially passed along a pipeline defined by the systolic array.

24. A network device to process data in a network device, the device comprising:
   means for receiving the network data at a security engine;
   means for receiving security operation data at the security engine, the security operation data being associated with a security operation to be performed on the network data;
   means for processing the security operation data into a plurality of security operation data components, each security operation data component configured to be used within a sub-operation to be performed on the network data;
   means for communicating the network data and the security operation data to a systolic array including a plurality of serially interconnected processing elements each defining a processing stage, the plurality of serially interconnected processing elements adapted to complete each respective processing stage in a fixed number of clock cycles, the fixed number of clock cycles common across the plurality of serially interconnected processing elements, and the plurality of serially interconnected processing elements each including a register file and a functional unit;
   means for processing data in each processing stage in parallel to obtain processed network data; and
   means for storing the processed data in a memory for use by a network processing module.

* * * * *